United States Patent
Kurian et al.

(10) Patent No.: US 10,992,735 B2
(45) Date of Patent: Apr. 27, 2021

(54) SYSTEM FOR GENERATING EVENT-BASED LINKAGES BETWEEN DISTRIBUTED RESOURCES FOR TAILORED DATA ACCESS

(71) Applicant: BANK OF AMERICA CORPORATION, Charlotte, NC (US)

(72) Inventors: Manu Jacob Kurian, Dallas, TX (US); Richard Huw Thomas, Charlotte, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 16/518,320

(22) Filed: Jul. 22, 2019

(65) Prior Publication Data
US 2021/0029194 A1 Jan. 28, 2021

(51) Int. Cl.
| | |
|---|---|
| H04L 29/08 | (2006.01) |
| G06F 21/62 | (2013.01) |
| H04L 12/911 | (2013.01) |
| H04L 29/06 | (2006.01) |
| G06Q 20/06 | (2012.01) |
| G06Q 20/38 | (2012.01) |

(52) U.S. Cl.
CPC .......... H04L 67/10 (2013.01); G06F 21/6236 (2013.01); H04L 47/783 (2013.01); H04L 63/08 (2013.01); H04L 63/10 (2013.01); G06Q 20/0658 (2013.01); G06Q 20/389 (2013.01); G06Q 2220/00 (2013.01); H04L 63/101 (2013.01)

(58) Field of Classification Search
CPC ....... H04L 63/08; H04L 63/10; H04L 63/101; H04L 67/10; G06F 21/62
See application file for complete search history.

(56) References Cited

U.S. PATENT DOCUMENTS

| | | |
|---|---|---|
| 7,778,422 B2 | 8/2010 | Freeman et al. |
| 8,843,998 B2 | 9/2014 | Fu et al. |
| 9,667,698 B2 | 5/2017 | Evans et al. |
| 10,044,756 B2 | 8/2018 | Overby, Jr. et al. |
| 10,129,177 B2 | 11/2018 | Chang et al. |

(Continued)

*Primary Examiner* — Jeong S Park
(74) *Attorney, Agent, or Firm* — Michael A. Springs; Moore & Van Allen PLLC; R. W. McCord Rayburn

(57) ABSTRACT

A system for generating event-based linkages between discrete distributed resources for tailored data visibility is provided. The system comprises: a memory device with computer-readable program code stored thereon; a communication device connected to a network; and a processing device, wherein the processing device is configured to: establish a first distributed resource and a second distributed resource, wherein the first distributed resource and the second distributed resource have different data privacy requirements; identify an event associated with both the first distributed resource and the second distributed resource, wherein the event is added as a block on each of the first distributed resource and the second distributed resource; and generate a link, via the block associated with the event, between the first distributed resource and the second distributed resource based on identifying the event, wherein the link is a shared segment between the first distributed resource and the second distributed resource.

20 Claims, 7 Drawing Sheets

(56) References Cited

U.S. PATENT DOCUMENTS

| | | |
|---|---|---|
| 10,142,347 B2 | 11/2018 | Kurian |
| 10,171,591 B2 | 1/2019 | Chandwani et al. |
| 2017/0046651 A1 | 2/2017 | Lin et al. |
| 2017/0046693 A1 | 2/2017 | Haldenby et al. |
| 2017/0046698 A1 | 2/2017 | Haldenby et al. |
| 2017/0230353 A1* | 8/2017 | Kurian ............... G06Q 20/4014 |
| 2017/0230375 A1* | 8/2017 | Kurian ................. H04L 63/102 |
| 2018/0254898 A1* | 9/2018 | Sprague ............... H04L 9/3271 |
| 2019/0243572 A1* | 8/2019 | Kursun ................ G06F 3/0632 |
| 2019/0244306 A1* | 8/2019 | Kursun ................ G06F 16/137 |
| 2019/0253524 A1* | 8/2019 | Hoshizuki ............ H04L 9/0637 |
| 2019/0318328 A1* | 10/2019 | Castinado ............. G06Q 20/06 |

* cited by examiner

SYSTEM FOR GENERATING EVENT-BASED LINKAGES BETWEEN DISTRIBUTED RESOURCES FOR TAILORED DATA ACCESS

BACKGROUND

Distributed resources allow for the transfer of information in a public setting using a distributed ledger on one or more nodes within the distributed resource. Distributed resources have been utilized to verify interactions between parties in order to legitimize and create a chain of record for the funds associated with each interaction within the distributed resource. Traditional distributed resources are by nature private or public. There exists a need to segment parts of a distributed resource for multiple types of access in different zones. This segmentation allows a distributed resource to share characteristics between private and public distributed resources while offering the benefits of both.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the following address these and/or other needs by providing an innovative system, computer-implemented method and computer program product for implementing a hybrid distributed resource architecture. A system for generating event-based linkages between discrete distributed resources for tailored data visibility is provided. The system comprises: a memory device with computer-readable program code stored thereon; a communication device connected to a network; and a processing device, wherein the processing device is configured to execute the computer-readable program code to: establish a first distributed resource and a second distributed resource, wherein the first distributed resource and the second distributed resource have different data privacy requirements; identify an event associated with both the first distributed resource and the second distributed resource, wherein the event is added as a block on each of the first distributed resource and the second distributed resource; and generate a link, via the block associated with the event, between the first distributed resource and the second distributed resource based on identifying the event, wherein the link is a shared segment between the first distributed resource and the second distributed resource.

In one embodiment, generating the link between the first distributed resource and the second distributed resource comprises generating a partial link between the first distributed resource and the second distributed resource, wherein the partial link provides semi-private data access between the first distributed resource and the second distributed resource. In another embodiment, the partial link is configured to restrict at least one of a read action and a write action between the first distributed resource and the second distributed resource.

In yet another embodiment, generating the link between the first distributed resource and the second distributed resource further comprises duplicating one or more blocks from at least one of the first distributed resource and the second distributed resource to the other. In yet another embodiment, generating the link between the first distributed resource and the second distributed resource further comprises generating a symlink between the first distributed resource and the second distributed resource, wherein the symlink is stored on at least one of the first distributed resource and the second distributed resource. In yet another embodiment, the link generated between the first distributed resource and the second distributed resource is time-based, wherein the event is a predetermined time limit.

In yet another embodiment, the first distributed resource and the second distributed resource are private distributed resources, and wherein the link is a public or semi-private link between the private distributed resources. In yet another embodiment, the first distributed resource is a private distributed resource and the second distributed resource is a semi-private distributed resource or a public distributed resource. In yet another embodiment, the event is associated with a resource transfer between a first user associated with the first distributed resource and a second user associated with the second distributed resource.

A method for generating event-based linkages between discrete distributed resources for tailored data visibility is provided. The method comprises: establishing a first distributed resource and a second distributed resource, wherein the first distributed resource and the second distributed resource have different data privacy requirements; identifying an event associated with both the first distributed resource and the second distributed resource, wherein the event is added as a block on each of the first distributed resource and the second distributed resource; and generating a link, via the block associated with the event, between the first distributed resource and the second distributed resource based on identifying the event, wherein the link is a shared segment between the first distributed resource and the second distributed resource.

In one embodiment, generating the link between the first distributed resource and the second distributed resource comprises generating a partial link between the first distributed resource and the second distributed resource, wherein the partial link provides semi-private data access between the first distributed resource and the second distributed resource. In yet another embodiment, the partial link is configured to restrict at least one of a read action and a write action between the first distributed resource and the second distributed resource.

In yet another embodiment, generating the link between the first distributed resource and the second distributed resource further comprises duplicating one or more blocks from at least one of the first distributed resource and the second distributed resource to the other. In yet another embodiment, generating the link between the first distributed resource and the second distributed resource further comprises generating a symlink between the first distributed resource and the second distributed resource, wherein the symlink is stored on at least one of the first distributed resource and the second distributed resource. In yet another embodiment, the link generated between the first distributed resource and the second distributed resource is time-based, wherein the event is a predetermined time limit.

In yet another embodiment, the first distributed resource and the second distributed resource are private distributed resources, and wherein the link is a public or semi-private link between the private distributed resources. In yet another embodiment, the first distributed resource is a private distributed resource and the second distributed resource is a semi-private distributed resource or a public distributed resource. In yet another embodiment the event is associated with a resource transfer between a first user associated with the first distributed resource and a second user associated with the second distributed resource.

A computer program product for generating event-based linkages between discrete distributed resources for tailored data visibility is provided. The computer program product comprises a non-transitory computer-readable medium comprising computer-readable instructions, the computer-readable instructions, when executed by a processing device, causes the processing device to: establish a first distributed resource and a second distributed resource, wherein the first distributed resource and the second distributed resource have different data privacy requirements; identify an event associated with both the first distributed resource and the second distributed resource, wherein the event is added as a block on each of the first distributed resource and the second distributed resource; and generate a link, via the block associated with the event, between the first distributed resource and the second distributed resource based on identifying the event, wherein the link is a shared segment between the first distributed resource and the second distributed resource.

In one embodiment, generating the link between the first distributed resource and the second distributed resource comprises generating a partial link between the first distributed resource and the second distributed resource, wherein the partial link provides semi-private data access between the first distributed resource and the second distributed resource.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
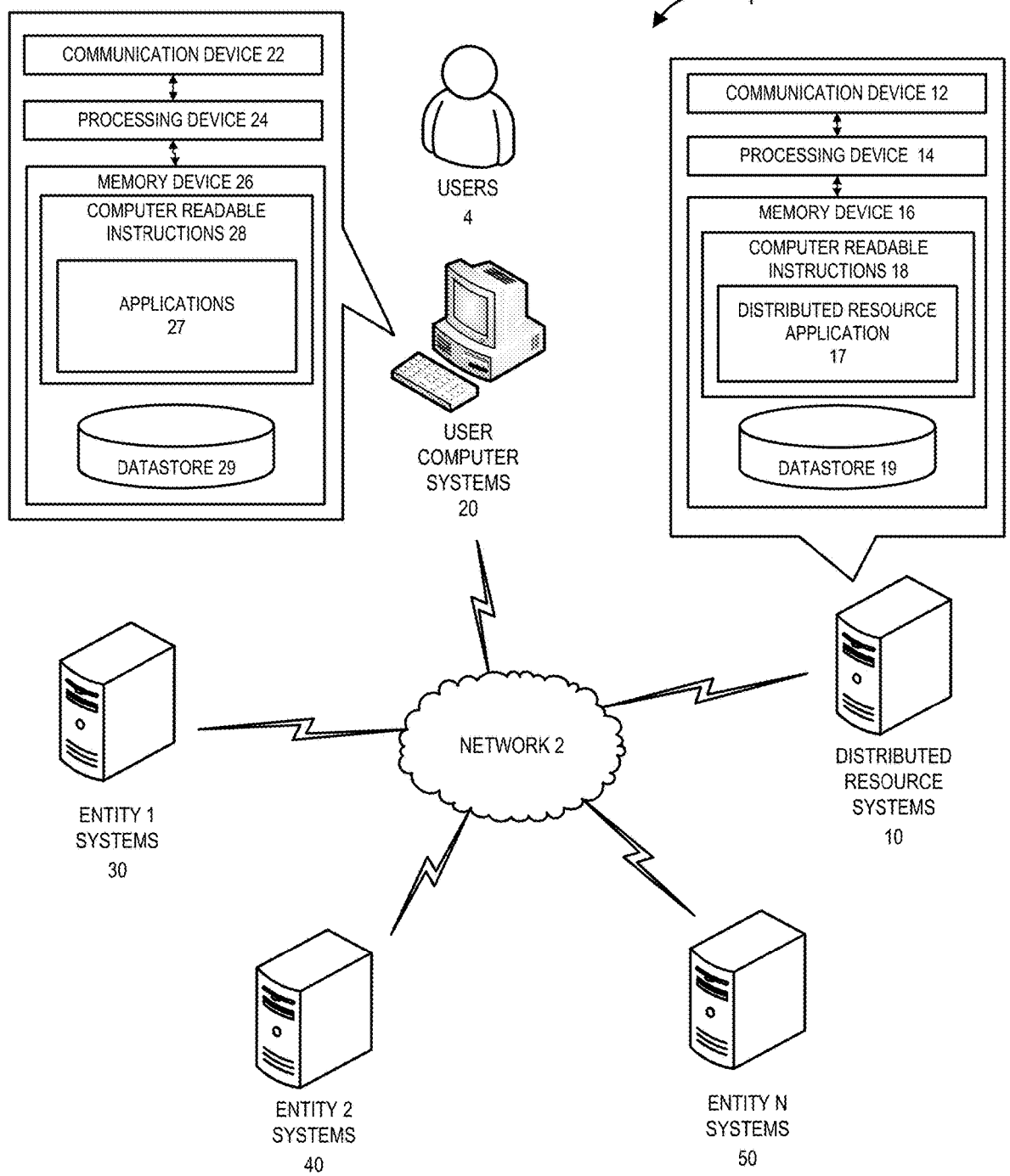
Figure 2:
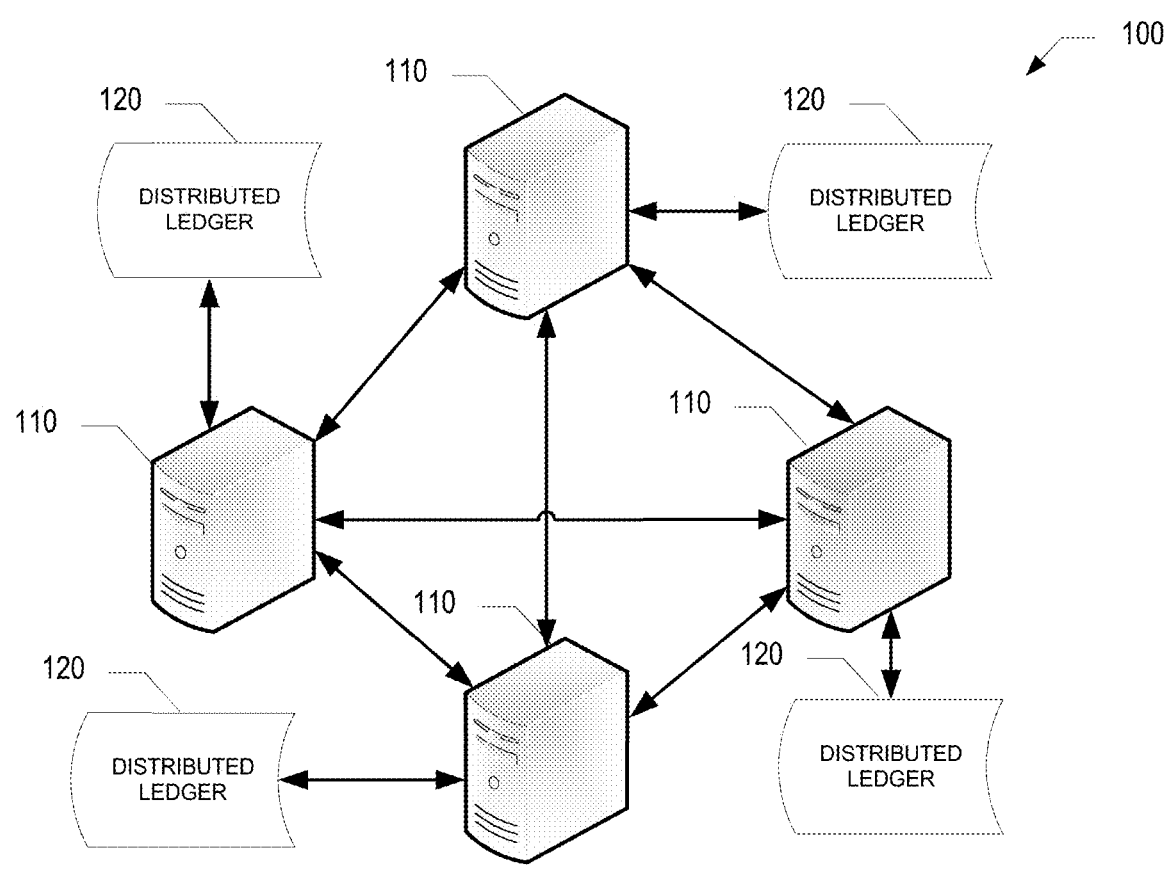
Figure 3:
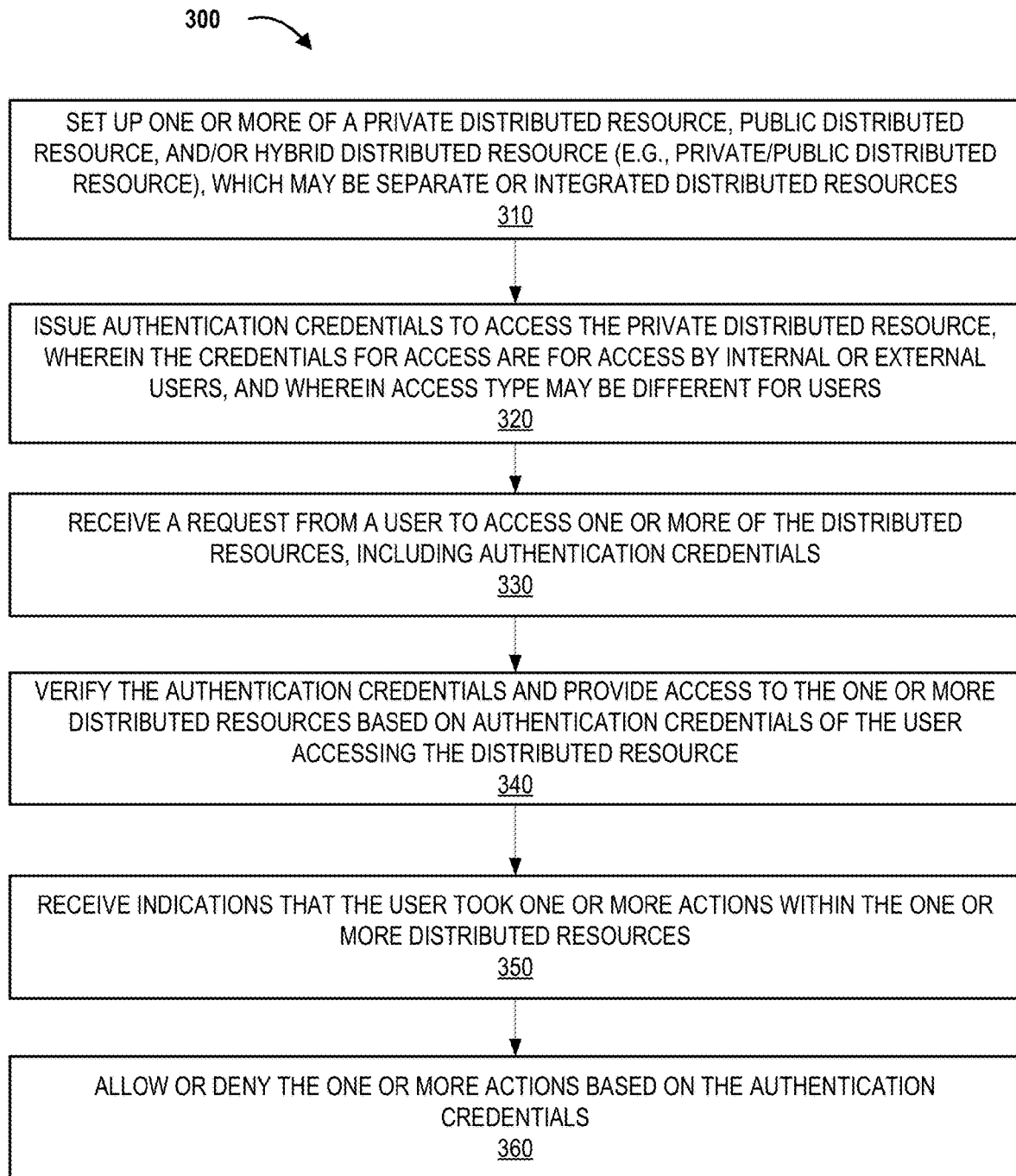
Figure 4:
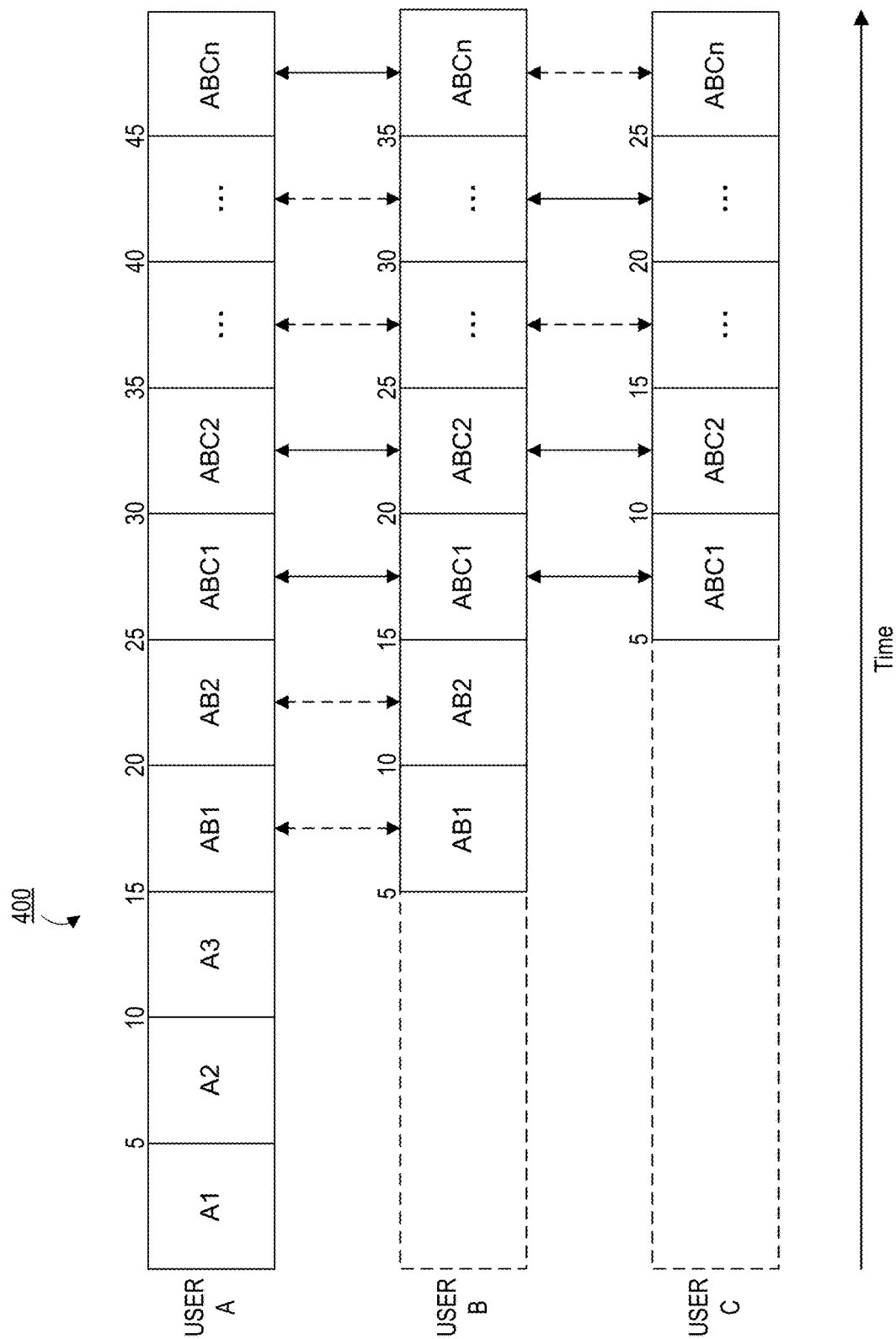
Figure 5:
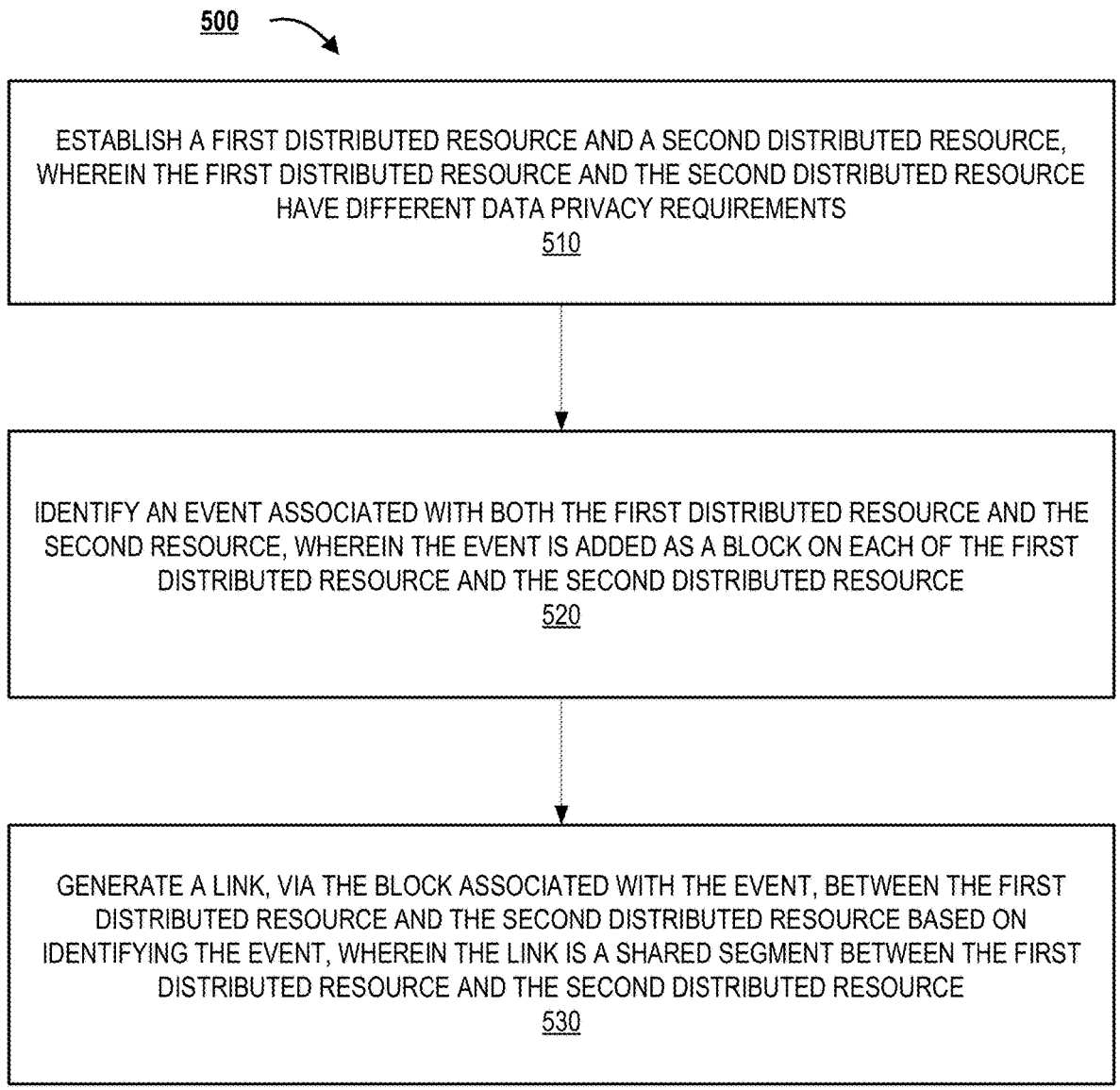
Figure 6:
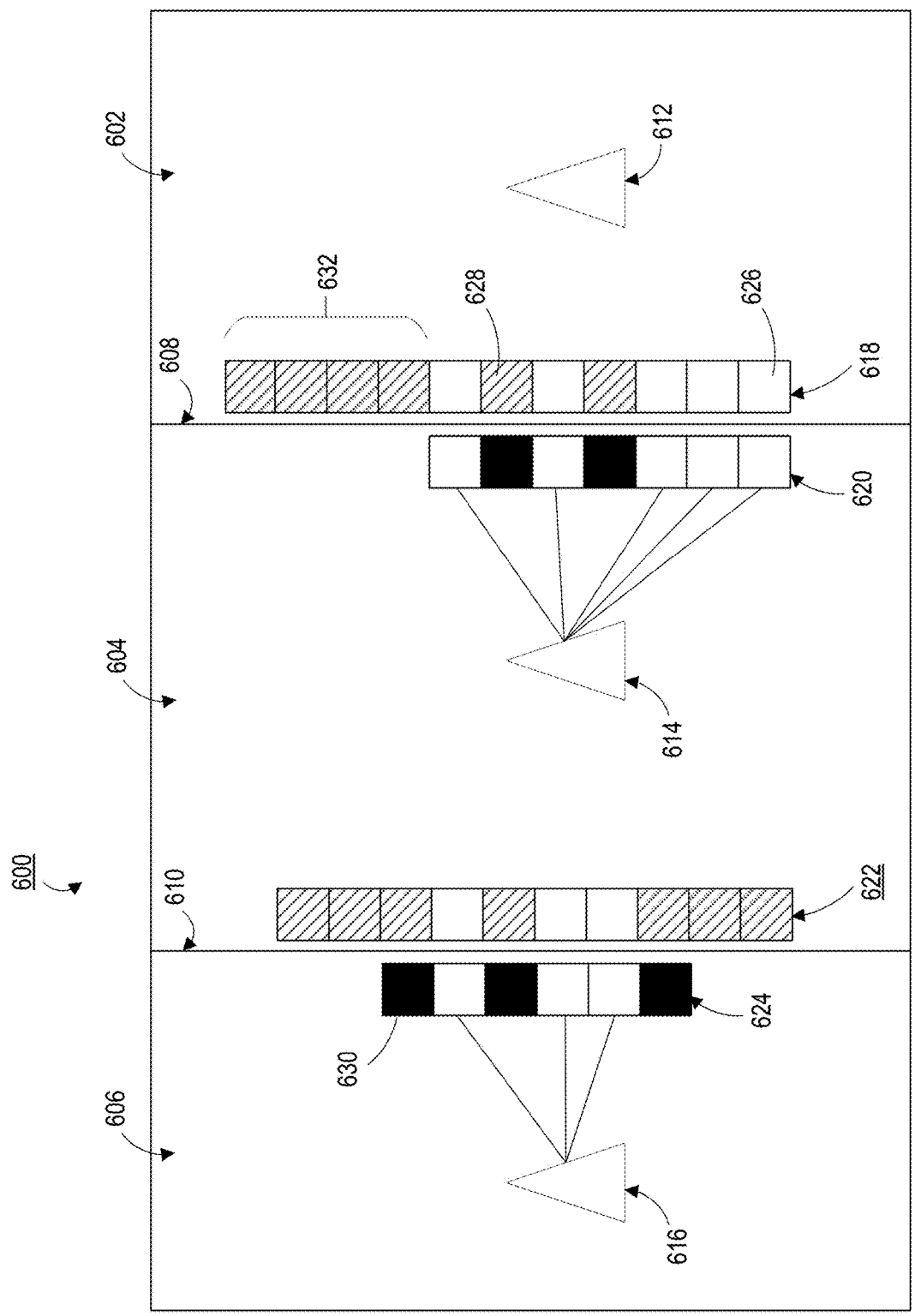
Figure 7:
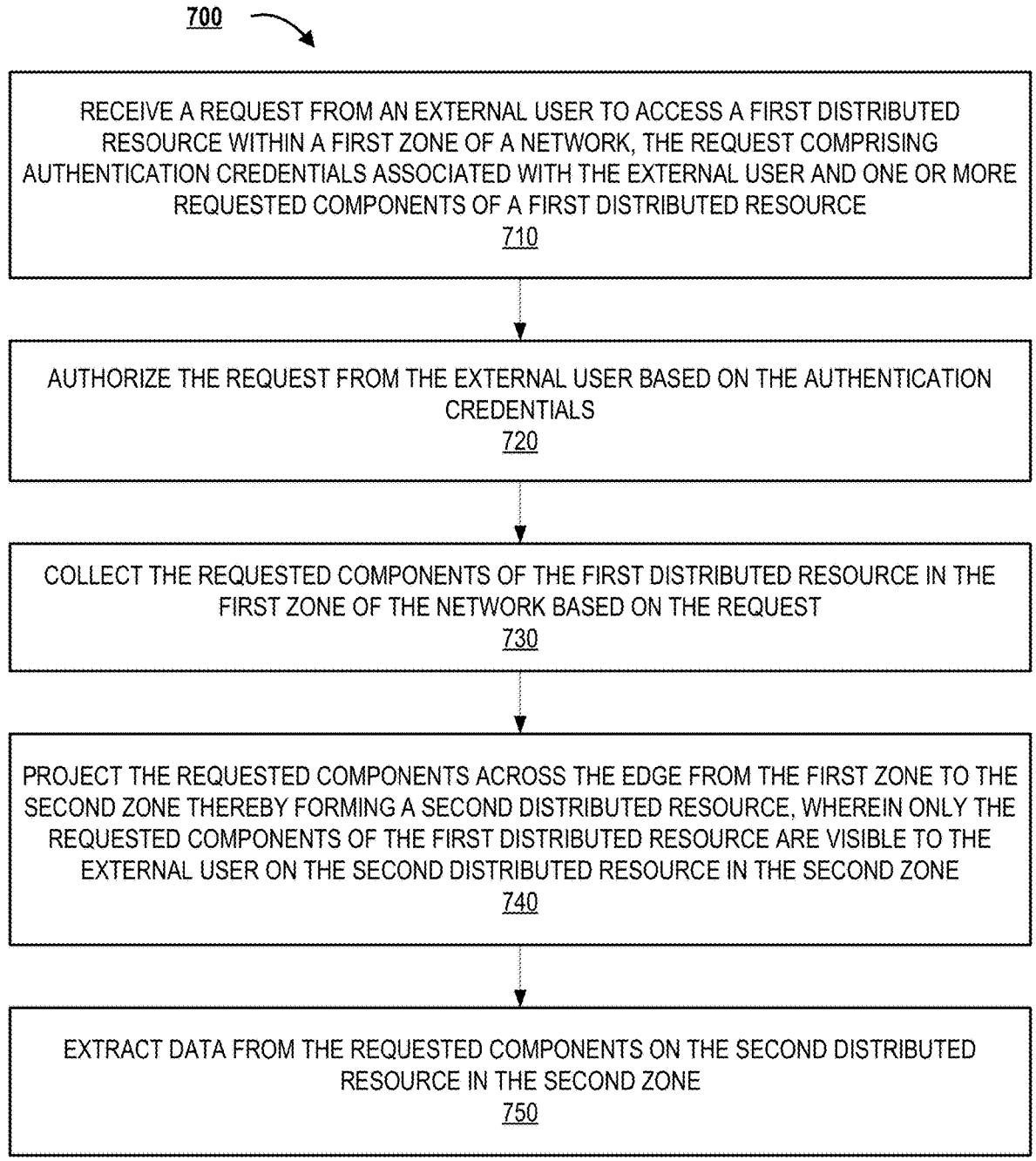

Having thus described embodiments of the invention in general terms, reference will now be made the accompanying drawings, wherein:

FIG. 1 provides a block diagram illustrating a distributed resource system environment, in accordance with aspects of the invention;

FIG. 2 provides a diagram illustrating a decentralized distributed resource network configuration, in accordance with aspects of the invention;

FIG. 3 provides a high level flow diagram for utilizing one or more distributed resources with private access authentication credentials, in accordance with aspects of the invention;

FIG. 4 provides an illustration of a hybrid distributed resource configuration 400, in accordance with aspects of the invention;

FIG. 5 provides a high level process flow for generating event-based linkages between distributed resources, in accordance with aspects of the invention;

FIG. 6 provides an illustration of a hybrid edge distributed resource configuration 600, in accordance with aspects of the invention; and FIG. 7 provides a high level process flow for secure distributed resource block mapping across a network edge, in accordance with aspects of the invention.

DETAILED DESCRIPTION OF EMBODIMENTS OF THE INVENTION

The present invention provides improved security and privacy for events by providing hybrid distributed resource configurations (i.e., block chains) having a combination of private, public, and/or semi-private portions linked or mapped together to allow the configuration to operate between multiple environments (i.e., public and private segments or zones) seamlessly while maintaining the data integrity of the block chain. In one embodiment, event-based linkages are formed between discrete block chains that may be bridged together at one or more points or blocks shared between the distributed resources. The discrete block chains may be linked together to provide a full accounting of an interaction or event history without fully exposing one block chain or the other completely thereby maintaining a level of privacy while providing customizable visibility between the chains. In another embodiment, components of a private blockchain may be projected by the system from a trusted network zone across an edge to another public or semi-private zone for authorized access. The system only maps visible portions of the private block chain from the trusted zone to another zone, wherein only those designated blocks are provided while maintaining privacy of those remaining to minimize data exposure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

Furthermore, as used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. In some embodiments, a device may refer to an entity's computer system, platform, servers, databases, networked devices, or the like. The device may be used by the user to access the system directly or through an application, online portal, internet browser, virtual private network, or other connection channel. The device may be a computer device within a network of connected computer devices that share one or more network storage locations.

As used herein, the term "computing resource" or "computing hardware" may be used to refer to elements of one or more computing devices, networks, or the like available to be used in the execution of tasks or processes. A computing resource may include processor, memory, or network bandwidth and/or power used for the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison or nodes of a block chain).

A "user" as used herein may refer to any entity or individual associated with the systems described herein. In some embodiments, a user may be a computing device user, a mobile device application user, a system operator, database manager, a support technician, and/or employee of an entity. In one embodiment, a user may be a third party user (i.e., an external user) having full or partial access to information stored on a block chain. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

In accordance with embodiments of the invention, the term "entity" may be used to include any organization or collection of users that may interact with the systems described herein. An entity may refer to a business, company, or other organization that either maintains or operates the system or requests use and accesses the system. The terms "financial institution" and "financial entity" may be used to include any organization that processes financial transactions including, but not limited to, banks, credit unions, savings and loan associations, investment companies, stock brokerages, management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution. In one embodiment, an entity may be a third party entity having full or partial access to information stored on a block chain.

To "monitor" is to watch, observe, or check something for a special purpose over a period of time. The "monitoring" may occur periodically over the period of time, or the monitoring may occur continuously over the period of time. In some embodiments, a system may actively monitor a database or data archive, wherein the system reaches out to the database and watches, observes, or checks the database for changes, updates, and the like. In other embodiments, a system may passively monitor a database, wherein the database provides information to the system and the system then watches, observes, or checks the provided information. In some embodiments a system, application, and/or module may monitor a user input into the system.

As used herein, An "interaction," an "action," or "event" may refer to any communication between one or more users, one or more entities or institutions, and/or one or more devices, nodes, chains, or systems within the system environment described herein. For example, an interaction may refer to a transfer of data between systems or devices, an accessing of stored data by one or more devices, a transmission of a requested task, or the like. In some embodiments an interaction or event may refer to resource transfer or transaction. In yet other embodiments, an interaction or event may refer to an action performed on a block chain (i.e., read, write, view, etc.)

Embodiments of the present invention provide utilizing one or more of a private block chain, a public block chain, and/or a hybrid block chain (e.g., a portion of the chain is private and a portion of the chain is public), which may be described herein as generally as a hybrid block chain. The one or more block chains may be used to take an action (e.g., access, create, view, store, disseminate, validate, or the like) information associated with an event or interaction, such as the exchange of resources, but also any type of information for an event or interaction that may occur internally or externally of one or more networks (e.g., associated with an entity).

Systems, methods, and computer program products are herein disclosed that provide for the use of a distributed resource. FIG. 1 illustrates a distributed resource system environment 1, in accordance with embodiments of the invention. As illustrated in FIG. 1, one or more distributed resource systems 10 are operatively coupled, via a network 2, to one or more user computer systems 20, entity 1 systems 30, entity 2 systems 40, entity $N^{th}$ systems 50 (e.g., any number of other entity systems), or other like systems. In this way, the users 4 (e.g., one or more associates, employees, agents, contractors, sub-contractors, third-party representatives, or the like) within the entities may access a distributed resource through the one or more distributed resource systems 10 and/or entity systems 20, 30, 40 within the distributed resource system environment 1. As such, the users 4 may utilize the user computer systems 20 to take actions with respect to the one or more distributed resources (e.g., private, public, and/or hybrid block chain). It should be understood that a distributed resource or general ledger associated with a distributed resource, or a portion thereof, may be located on each user's computer system 20, one or more entity systems 30, 40, 50, or through one or more distributed resource systems 10 (e.g., private distributed resource systems or public distributed resource systems), all of which may be described as nodes (explained in further detail with respect to FIG. 2) which are used to store information related to the events, such as on a single ledger or a distributed ledger located on various nodes. The ledger may be public, private, and/or have ledger portions that are private and other ledger portions that are public.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2. In a particular embodiment, the network 2 may comprise the Internet. In yet another particular embodiment, the network 2 may comprise a cloud network.

In some embodiments, the user 4 is an individual or entity using the present invention over the network 2. In some embodiments a user 4 is an individual or entity accessing or performing another action on data or information related to an event or interaction stored on a distributed resource. In other embodiments, the user 4 is an individual or entity managing data storage on the distributed resource. In some embodiments, the user 4 is an individual or entity providing authentication credentials to the systems described herein in order to perform an action on the data stored in the distributed resource. In some instances, a single entity may establish and control the private distributed resource portion, such that the single entity controls access to the private distributed resource portion (e.g., a private block chain or a hybrid block chain with a private block chain portion having nodes which are stored within the entity's in-house network or nodes outside of the controlling entity which are only allowed to access the private block chain when the node and/or user is authenticated). In other embodiments, two or more entities may establish and/or control access to the private distributed resource portion. Alternatively, a single node may be associated with each entity, such that the users within the entity access the entity node in order to access the private distributed resource portion. The one or more entities controlling access to the private distributed resource, or hybrid distributed resource, may issue authentication credentials to users internally within the entity, externally for access by users at other entities, or both in order to allow and control access to the private distributed resource, or hybrid distributed resource.

It is understood that the servers, systems, and devices described herein illustrate one embodiment of the invention. It is further understood that one or more of the servers, systems, and devices can be combined in other embodiments and still function in the same or similar way as the embodiments described herein.

As illustrated in FIG. 1, the distributed resource systems 10 generally comprise one or more communication devices 12, one or more processing devices 14, and one or more memory devices 16. The one or more processing devices 14 are operatively coupled to the one or more communication devices 12 and the one or more memory devices 16. As used herein, the term "processing device" or "processor" generally includes circuitry used for implementing the communication and/or logic functions of a particular system. For example, a processing device 14 may include a digital signal processor component, a microprocessor component, and various analog-to-digital converters, digital-to-analog converters, and other support circuits and/or combinations of the foregoing. Control and signal processing functions of the system are allocated between these processing devices according to their respective capabilities. The one or more processing devices 14 may include functionality to operate one or more software programs based on computer-readable instructions 18 thereof, which may be stored in the one or more memory devices 16.

The one or more processing devices 14 use the one or more communication devices 12 to communicate with the network 2 and other components on the network 2, such as, but not limited to, the user computer systems or device 20, the entity 1 systems 30, the entity 2 systems 40, the entity $N^{th}$ systems 50, or other like systems. As such, the one or more communication devices 12 generally comprise a wireless transceiver, modem, server, electrical connection, electrical circuit, or other component for electronically communicating with other components on the network 2. The one or more communication devices 12 may further include an interface that accepts one or more network interface cards, ports for connection of network components, Universal Serial Bus (USB) connectors and the like.

As further illustrated in FIG. 1, the distributed resource systems 10 comprise computer-readable instructions 18 stored in the memory device 16, which in one embodiment includes the computer-readable instructions 18 of the distributed resource application 17. In some embodiments, the one or more memory devices 16 include one or more data stores 19 for storing data related to the distributed resource systems 10, including, but not limited to, data created, accessed, and/or used by the distributed resource application 17. In one embodiment, the distributed resource systems 10 and/or the distributed resource application 17 comprise at least a portion of authentication information for authenticating or validating user access to portions of a block chain. In some embodiments, at least a portion of the authentication information is stored on a user device 20. In one embodiment, authentication information from both the distributed resource systems 10 and the user device 20 is required to authenticate user access to a portion of a block chain, such as a private portion of a block chain.

It should be understood that the distributed resource systems 10, and the components therein, may be one or more private distributed resources, one or more public distributed resources, and/or one or more hybrid distributed resources. As explained in further detail later the distributed resource systems 10 may be located in or associated with the other systems described herein. In some embodiments, the distributed resource systems 10 may comprise one or more private, public, and/or hybrid distributed resources linked or otherwise in communication with one another, wherein portions of the distributed resource systems 10 may be segmented between public, private, and/or semi-private portions.

As illustrated in FIG. 1, users 4 may access the distributed resource application 17 on the one or more distributed resource systems 10, or a portion thereof stored on other systems (e.g., a portion of the distributed resource application 17 stored on the user computer systems 20 or entity systems 30, 40, 50), or through other applications, through a user computer system or device 20. The user computer system or device 20 may be a desktop, laptop, tablet, mobile device (e.g., smartphone device, or other mobile device), or any other type of computer that generally comprises one or more communication devices 22, one or more processing devices 24, and one or more memory devices 26.

The one or more processing devices 24 are operatively coupled to the one or more communication devices 22, and the one or more memory devices 26. The one or more processing devices 24 use the one or more communication devices 22 to communicate with the network 2 and other components on the network 2, such as, but not limited to, the distributed resource systems 10, the entity 1 systems 30, the entity 2 systems 40, the entity $N^{th}$ systems 50, or other systems. As such, the one or more communication devices 22 generally comprise a wireless transceiver, modem, server, electrical connection, or other component for electronically communicating with other components on the network 2. The one or more communication devices 12 may further include an interface that accepts one or more network interface cards, ports for connection of network components, Universal Serial Bus (USB) connectors and the like. Moreover, the one or more communication devices 22 may include a keypad, keyboard, touch-screen, touchpad, microphone, mouse, joystick, other pointer component, button, soft key, and/or other input/output component(s) for communicating with the users 4.

As illustrated in FIG. 1, the user computer systems 20 may have computer-readable instructions 28 stored in the one or more memory devices 26, which in one embodiment includes the computer-readable instructions 28 of applications 27, such as dedicated applications (e.g., apps, applet, or the like), portions of dedicated applications, web browser or other apps that allow access to applications located on other systems, or the like. As previously discussed, the distributed resource application 17, or a portion thereof, may be stored on each of the user computer systems 20.

As illustrated in FIG. 1, the entity 1 systems 30, the entity 2 systems 40, the entity $N^{th}$ systems 50, or other systems are operatively coupled to the distributed resource systems 10 and/or user computer systems 20, through the network 2.

These systems have components that are the same as or similar to the components described with respect to the distributed resource systems 10 and/or user computer systems 20 (e.g., one or more communication devices, one or more processing devices, and one or more memory devices with computer-readable instructions of one or more applications, one or more datastores, or the like). Thus, the entity 1 systems 30, the entity 2 systems 40, the entity $N^{th}$ systems 50, or other systems communicate with the distributed resource systems 10, the user computer systems 20, and/or each other in same or similar way as previously described with respect to the distributed resource systems 10 and/or the user computer systems 20. The entity systems 30, 40, 50 may be made up of one or more user systems 20, one or more of the distributed resource systems 10, or other entity systems that act as nodes (explained in further detail with respect to FIG. 2) which are utilized to store, disseminate, and/or validate event information for events within the block chain. It should be further understood that the distributed resource systems 10 may be separate systems and/or a part of each user computer system 20, and/or entity systems 30, 40, 50. In one embodiment, one or more entities associated with the entity systems 30, 40, 50 may be third party entities having full or partial access to information stored on a distributed resource.

FIG. 2 provides a distributed resource system diagram, illustrating how a block chain operates. Rather than utilizing a centralized database to access, view, store, disseminate, and/or validate information, the present invention utilizes a decentralized block chain configuration or architecture, as shown in FIG. 2 in one aspect of the invention, in order to allow users to access, view, store, disseminate, and/or validate information, or take another action related to an event or interaction. Such a decentralized block chain configuration ensures accurate mapping and validation of event information, and provides a secured network over which information may be validated. Accordingly, block chain configurations may be utilized with respect to any type of information, such as, but not limited to maintaining an accurate ledger of information, such as resource transfer information (e.g., transaction, funds transfer, sale, or other like transfer of value information (e.g., data transfers)), personal information, credit history information, or the like, in order to provide validation, such as validation of resource transfers, or access to personal information, or the like.

The terms "block chain," "blockchain," "distributed resource," or "distributed ledger," as used herein, refer to a decentralized electronic ledger of data records which are authenticated by a federated consensus protocol. Multiple computer systems within the block chain, referred to herein as "nodes," each comprise a copy of the entire ledger of records. Nodes may write a data "block" to the block chain, the block comprising data regarding a transaction, said blocks further comprising data and/or metadata. In some embodiments, only certain nodes (e.g., miner nodes) may write transactions to the block chain. In other embodiments, all nodes have the ability to write to the block chain. In some embodiments, the block may further comprise a time stamp and a pointer to the previous block in the chain (e.g., a "hash"). In some embodiments, the block may further comprise metadata indicating the node that was the originator of the transaction. In this way, the entire record of transactions is not dependent on a single database which may serve as a single point of failure; the block chain will persist so long as the nodes on the block chain persist.

Stated another way, a block chain is a distributed database that maintains a list of data records, the security of which is enhanced by the distributed nature of the block chain. A block chain typically includes several nodes, which may be one or more entities, systems within an entity, machines, computers, databases, data stores, or the like operably connected with one another. For example, the various systems described with respect to FIG. 1, or systems within the systems described with respect to FIG. 1 may be nodes. In some aspects of the invention, an entity may be a node of a block chain, and internal or external users 4 may access the entity systems in order to take actions with respect to an event or interaction. In other aspects of the invention various systems within an entity may be nodes, which may or may not be grouped together and associated with the entity. In other aspects of the invention, each of the nodes or multiple nodes are maintained by different entities, or components within an entity, and as such different systems within an entity or between entities may act as nodes. A block chain typically works without a central repository or single administrator, however, as discussed in the present invention a network of nodes within a single entity or group of entities may together serve as a central repository or single administrator that can control access to the block chain that is associated with a plurality of different nodes. One application of a block chain is the public ledger of resource transfers for cryptocurrencies, such as used in bitcoin. In this use of a block chain, the data records recorded in the block chain are enforced cryptographically and stored on the nodes of the block chain.

A public block chain may refer to a block chain that is completely open to any user (i.e., full visibility), wherein the users may send and receive transactions without requiring permissions. Public block chains generally offer little to no privacy for actions recorded therein. Private block chain may refer to a block chain having permissioned access, wherein access to the block chain requires an invitation, valid authentication credentials be provided, or the like. In another embodiment, a private block chain is on a private, closed, or trusted network The block chain typically has two primary types of records. The first type is the event type (e.g., resource transfer type, document type, or the like), which consists of the actual data stored in the block chain. The second type is the block type, which are records that confirm when and in what sequence certain events (e.g., resource transfers, or the like) became recorded as part of the block chain. A "block" as used herein may refer to one or more records of a file with each record comprising data for transmission to a server. In some embodiments, the term record may be used interchangeably with the term block to refer to one or more transactions or data within a file being transmitted. Events or interactions (e.g., resource transfers, or the like) are created by participants using the block chain in its normal course of business, for example, when someone sends cryptocurrency to another person), blocks are created by users known as "miners" who use specialized software/equipment to create the blocks for the event. Users of the block chain create blocks for the events (e.g., resource transfers, or the like), which are passed around to various nodes of the block chain. A "valid" resource transfer is one that can be validated based on a set of rules that are defined by the particular system implementing the block chain. For example, in the case of cryptocurrencies, a valid resource transfer is one that is digitally signed, spent from a valid digital wallet and, in some cases, meets other criteria. In some block chain systems, miners are encouraged to create blocks by a reward structure that offers a pre-defined per-block reward and/or payments offered within the resource transfers validated themselves. Thus, when a miner successfully validates a resource transfer on the block chain, the miner may receive rewards and/or payments as encouragement to continue creating new blocks.

As mentioned above and referring to FIG. 2, a block chain 100 is typically decentralized—meaning that a distributed ledger 120 (i.e., a decentralized ledger) is maintained on multiple nodes 110 of the block chain 100. One node in the block chain may have a complete or partial copy of the entire ledger or set of events (e.g., resource transfers, or the like) and/or blocks on the block chain. Events or interactions (e.g., resource transfers, or the like) are initiated at a node of a block chain and communicated to the various other nodes of the block chain. Any of the nodes, or users of the nodes, which have access to the block chain to validate an event, add the event to its copy of the block chain, and/or broadcast the event (e.g., resource transfer or the like) its validation (in the form of a block) and/or other data to other nodes. This other data may include time-stamping, such as is used in cryptocurrency block chains.

In particular, the block chain begins with a genesis block and is subsequently lengthened by incrementally appending blocks in series to the genesis block. Generally, the data within each block within the block chain may not be modified by the nodes of the block chain; data may only be added through the addition of a block to the last block in the block chain. Each block added to the block chain may comprise a timestamp and a pointer to the previous block in the block chain (e.g., a "hash"). In this way, the block chain may provide an immutable record of data records over a period of time. In some embodiments, in order for a new block to be added to the block chain, a pending data record may be proposed to be added to the block chain. The nodes may then, via a "consensus algorithm" or "consensus mechanism," come to a consensus as to the contents of the data in the block chain. Once a consensus has been reached by the nodes that the pending data record is valid, the nodes append the data record to the last block in the block chain. In this way, each node maintains a validated copy of the block chain such that the block chain may remain accessible even if one or more nodes become unavailable (e.g. a node is offline due to maintenance, malfunction, etc.) and may further account for divergence from the true copy of the block chain which may occur at the node level (e.g. a copy of the block chain on a particular node becomes invalid due to data corruption, malicious editing, and the like). In other words, the consensus mechanism ensures that, over time, each node hosts a copy of the block chain that is consistent with the other nodes.

Embodiments of the invention as described herein may utilize one, several, or a combination of a number of different consensus algorithms to ensure the integrity of the data within the block chain. In some embodiments, the consensus mechanism may be a "proof of work" ("PoW") algorithm, in which the nodes perform a series of calculations to solve a cryptographic puzzle. For instance, in order to validate a pending data record, the nodes may be required to calculate a hash via a hash algorithm (e.g. SHA256) which satisfies certain conditions set by the system. Calculating a hash in this way may be referred to herein as "mining," and thus a node performing the mining may be referred to as "miners" or "miner nodes."

"Miner node" as used herein refers to a networked computer system or device that authenticates and verifies the integrity of pending transactions on the block chain. The miner node ensures that the sum of the outputs of the transaction within the block matches the sum of the inputs. In some embodiments, a pending transaction may require validation by a threshold number of miner nodes. Once the threshold number of miners has validated the transaction, the block becomes an authenticated part of the block chain. By using this method of validating transactions via a federated consensus mechanism, duplicate or erroneous transactions are prevented from becoming part of the accepted block chain, thus reducing the likelihood of data record tampering and increasing the security of the transactions within the system.

A block chain provides numerous advantages over traditional databases. For example, with respect to utilizing a block chain for resource transfer information, a large number of nodes of a block chain may reach a consensus regarding the validity of a resource transfer contained on a decentralized resource transfer ledger. Similarly, when multiple versions of a document or resource transfer exist on the ledger, multiple nodes can converge on the most up-to-date version of the resource transfer. For example, in the case of a virtual currency resource transfer, any node within the block chain that stores or validates the resource transfer, can determine within a level of certainty whether the resource transfer can take place and become final by confirming that no conflicting resource transfers (i.e., the same currency unit has not already been spent) are confirmed by the block chain elsewhere on other nodes.

Various other specific-purpose implementations of block chains may be developed. These include distributed domain name management, decentralized crowd-funding, contract execution, analyst reporting, financial reporting, synchronous/asynchronous communication, decentralized real-time ride sharing, controlling access to or dissemination of timeline, personal, and/or financial data (e.g., a credit report, or the like) and even a general purpose deployment of decentralized applications. As such, block chains may be utilized to access, view, store, create, disseminate, and/or validate any type of event information, or take any other type of action with respect to event information associated with an event.

In various aspects, the block chain may be configured with a set of rules (otherwise described herein as "limits") to dictate what actions may be taken by users and/or nodes for various events, how information may be accessed, created, stored, disseminated, and/or validated, and/or how the network communicates information throughout the one or more block chains across the nodes of various entities associated with the nodes (e.g., supports the nodes on the entity systems). In some embodiments, rules or limits may be predetermined according to authentication credentials provided by a user or system requesting access to the block chain.

In various aspects, any of the nodes 110 illustrated in FIG. 2, may be a validator or a miner that validates events (e.g., resource transfers, or the like). In some aspects, a number of the nodes 110 must validate an event (e.g., resource transfer, or the like) in order for the event to be approved. For example, in one embodiment, two or three nodes 110 must validate the authenticity of the event, or portions thereof, before the event may be approved. In some instances, the rules of the block chain and/or rules specific to particular originating entities or validators dictate that validators cannot approve events without confirming available information (e.g., funds used in a resource transfer). In some cases, the available information is already associated with an alias on the public block chain, or associated with a customer within an entity controlling a private block chain, but in other cases, the validator on the block chain must communicate with the originating entity in order to request approval of the event (e.g., resource transfer, or the like).

In some aspects, the rules may only be changed by the originating node (maintained by an originating entity or entities that control the block chain) to ensure the validity of a change to a rule. In some cases, particularly in cases where one or more nodes have raised a concern that an event is not valid, the originating node may be contacted for verification of the event.

In various aspects, the event, or information for the event, is stored and executed from one or more systems and is not placed on the public block chain itself, and instead is located on a private portion of the block chain. In some aspects, the event, or information for the event, is only stored and executed from a subset of the nodes of the block chain, which, in some aspects, are synonymous with validator nodes and in other aspects are not synonymous with the validator nodes. In some aspects, placeholder(s) for the event (e.g., resource transfers, or the like) indicating that the event exists and/or a description of the event, is accessible from private block chains and may be placed on the public block chain. The placeholder(s) may be identifiers (e.g., characters, or the like) and/or a description of the event. In some cases, the event may be executed only by the designated one or more systems (e.g., on the private block chain, or on a private portion of a block chain). Such systems may utilize a key or other security mechanism(s) in order to ensure only certain nodes are allowed access to the information related to the private block chain portion. In some cases, this configuration may result in additional security instead of placing the event on the public block chain for any node to execute.

Traditional blockchains are by nature private or public. As such, there exists a need to segment parts of a block chain for multiple types of access in different zones. This segmentation allows a block chain to share characteristics between private and public block chains while offering the benefits of both thereby providing an improvement over traditional block chain technology. The embodiments described further herein combine private and public aspects of block chain and allow for operation in multiple environments seamlessly (i.e., public, private, semi-private environments) while maintaining data integrity from a block chain standpoint.

FIG. 3 presents a flow diagram for a utilizing a private, public, and/or hybrid distributed resource, in accordance with aspects of the invention. In some aspects of the invention, one or more of a private block chain, public block chain, and/or a hybrid block chain may be set up, as illustrated in block 310. In one aspect of the invention, the private block chain may be hosted on the systems of a single entity, such as entity 1. In this way, the private block chain systems, or private portions of the block chain systems 10 may be controlled by a single entity. The single entity (e.g., entity 1) would thus control who (e.g., what entities, nodes, and/or users 4 within the entities) would be able to take an action (e.g., access, view, create, store, disseminate, and/or verify) for events or interactions (e.g., resource transfer, contract, analysis report, financial report, communication, retrieve document information, or the like) using the private block chain systems 10. In other aspects of the invention, multiple entities may host the private block chain, and thus, control the block chain systems 10 and who can take actions (e.g., access, view, create, store, disseminate, and/or verify) on an event using the private block chain systems 10. It should be understood that controlling the access to the private block chain portions improves upon the security of the actions taken with respect to the events because the access to the private block chain is limited in addition to the security provided by utilizing the decentralized ledger of a block chain for the events.

In some aspects of the invention, events may be resource transfers, and thus, the private block chain systems 10 may be utilized to validate resource transfers that occur using accounts of the one or more entities, such as but not limited to financial accounts of clients that utilize accounts within a financial institution to enter into resource transfers. As such, these resource transfers may be validated, as previously described herein, using the private block chain, and thereafter the results of the validation may be shared publicly, such as through public block chains, as will be discussed in further detail later. In another aspect of the invention, events may be accessing information from a documents, such as a credit report. The access to different portions of the credit report my included a tiered level of access for which some users may access only credit worthiness, while other users may access credit worthiness and personal information, still others may access worthiness, personal, and financial information, and others may access all information, as will be discussed in further detail later. In other aspects of the invention the events may be any other type of event, such as but not limited, signing and storing documents, storing and disseminating public and private information, or the like, and the actions may be any type of action related to the event.

In another aspect of the invention the public block chain may be utilized as discussed with respect to FIG. 2. As such, in the public block chain there are no restrictions or lessened restrictions on users or nodes that may be able to take an action (e.g., access, view, create, store, disseminate, and/or validate) on an event or interaction. As previously discussed, a public block chain may allow a user to access to a node, or the user may utilize the user computer systems 20 as a node in order to take actions within a public block chain for an event.

Moreover, in other aspects of the invention, a hybrid block chain may be utilized. A hybrid block chain has elements of a private block chain and elements of a public block chain. A hybrid block chain (or a combination of private block chain and public block chain) may be used to record the fact that the event happened, and even that it happened correctly publicly, without exposing confidential details about the subject matter or the parties involved privately. For example, as will be discussed in further detail later an action (e.g., access, create, store, disseminate, and/or validate) may be taken by a user 4 on some information (e.g., a first portion of information) associated with an event using the private portion of the block chain, while actions may be taken by a user 4 (same or different user) on other information (e.g., a second portion of information) associated with an event using a public block chain. As such, some information related to an event may remain private, while other information may remain public, as will be discussed in further detail throughout.

It should be understood that one or more of the block chains may be utilized in order to perform the aspects of this invention either alone or in combination with other block chains. It should be further understood that one or more of these block chains may be stored on the systems of one or more of the entities. For example, the private block chain, or the portion of the hybrid block chain that is private, may be controlled by a single entity. In other aspects of the invention, two or more entities may control access to the private block chain or the portion of the hybrid block chain that is private. Alternatively, the public block chain and/or the portions of the hybrid block chain that are public, may be accessed by any of the entities, including the entity that controls the private block chains.

Block 320 of FIG. 3 illustrates that the one or more entities controlling the private block chain portion (e.g., the private block chain and/or the portions of the hybrid block chain that are private) may create and issue authentication credentials to control access to the private block chain portions. The authentication credentials may be limited to users 4 that are employed by the one or more entities controlling the private portions of the block chain (e.g., internal users), or otherwise may be users 4 of one or more other entities that do not control the private block chain (e.g., external users). In other instances, different users (e.g., different users within each of the one or more entities, different users from outside of the one or more entities, and/or different users between the entities) have different authentication credentials, which allow or prevent the users from taking specific actions on specific events within the block chain systems 10. The authentication credentials may allow one user type to take any action (e.g., access, view, create, store, disseminate, and/or verify) on events (e.g., resource transfers, document access, contracts, analysis reports, documents, or the like), while other users 4 may only be allowed to take one or more types of actions on the events (e.g., only access, only view, or only disseminate). In other aspects, the authentication credentials may limit or allow one or more users 4 to take actions on a particular event. For example, one user may access, view, store, disseminate, and/or validate all resource transfers, while other users may only access, view, and disseminate information related to an event. In other aspects of the invention, the authentication credentials may be placed on the nodes from which the users 4 access the block chain, and as such, the nodes may only take specific actions on specific events. Alternatively, both the users and nodes may require authentication credentials.

FIG. 3 illustrates in block 330, that the system controlling the private block chain portion may receive a request from a user 4 to access the private block chain portion and/or an event therein, and/or take another action within the private block chain portion. The request received from the user 4 may include the authentication details of the user 4, node, or both. For example, even before a user 4 can access a node, utilize a node (e.g., save something to a node, create a block for the block chain, access information from a block chain, or the like), access the block chain through a node, and/or access an event in the block chain, the present invention may require the user 4 to provide authentication credentials, such as but not limited to providing a user name and/or password or providing a key. In one example, the user may submit to the block chain a particular action for an event, but the action will not be completed (e.g., create an entry for the block chain) until the user 4 is verified as having the requested authentication to take the action.

Block 340 of FIG. 3, illustrates that the system verifies the authentication credentials of the user 4 and allows the user to access to the block chain and/or take the actions with respect to the event. For example, the user 4 may access a block chain to verify a resource transfer for a financial institution.

Block 350 of FIG. 3 illustrates that an indication is received that the user took an action within the one or more block chains. For example, as previously discussed the user 4 may access, view, create, store, disseminate, and/or validate (or take another action) with respect to an event, such as a resource transfer.

Block 360 of FIG. 3 illustrates that after the indication of the action is received, the action is allowed or denied based on the authentication credentials of the user 4. Once the allowed, a record of the action for the event may be stored in the block chain (e.g., creation of an entry in the block chain to validate the event, dissemination of the event, or the like). Moreover, once the action is allowed, the entry into the block chain may be distributed to the one or more users 4 that have access to the particular block chain. For example, other users 4 may be able to verify the action of the user for the event, access the entry, be pushed a report of the changes, and/or be notified that changes took place to the block chain.

As previously discussed, while traditional block chains are by nature either public or private, embodiments discussed herein provide various ways of combining aspects of public and private block chains allowing for full or partial access to different segments or portions of a block chain configuration. In this way, the invention provides on-demand access to data and information on the block chain on a need-to-know basis, wherein the block chain configuration may operate in multiple environments (e.g., private, public, and semi-private environments) seamlessly while still maintaining data integrity on the block chain.

FIG. 4 provides an illustration of a hybrid distributed resource configuration 400, in accordance with aspects of the invention. The illustration depicts three discrete block chains associated with separate users (i.e., user A, user B, user C) over time. The first block chain associated with user A comprises blocks A1 to ABCn. The second block chain associated with user B comprises blocks AB1 to ABCn. The third block chain associated user C comprises blocks ABC1 to ABCn. It should be understood that the hybrid block chain configuration 400 illustrated in FIG. 4 should not be viewed as necessarily limiting. It should be understood that in other embodiments, it is conceived that the block chain configuration 400 may comprise more or fewer discrete block chains, users, blocks, links between discrete block chains, or the like.

FIG. 5 provides a high level process flow for generating event-based linkages between distributed resources, in accordance with aspects of the invention. The process flow of FIG. 5 may correspond to a hybrid block chain configuration such as, but not limited to, the hybrid block chain configuration of FIG. 4. At block 510, the system is first configured to establish one or more block chains as previously discussed herein. In one embodiment, the one or more block chains may be associated with one or more corresponding users. For example, in the exemplary embodiment of FIG. 4, the block chain configuration 400 comprises three different block chains associated with three different users, i.e., user A, user B, and user C. In other embodiments, the one or more of the block chains may be associated with the same user, wherein the one or more block chains associated with the same user may be distinct and otherwise unconnected to one another. For example, different block chains may be used to record data associated with different aspects of the same user, wherein a first block chain may record events associated with a user's house, while a second block chain may record events associated with the user's car.

In some embodiments, the one or more block chains may have different data privacy requirements. In one embodiment, different data privacy requirements may refer to the ability for an external user to access and/or perform actions on the data or information stored in a block chain. In a specific embodiment, data privacy requirements may refer to a block chain being publicly accessible (i.e., open access), privately accessible (i.e., permissioned access), or semiprivately accessible (i.e., hybrid access). For example, as illustrated in FIG. 4, the block chains of the configuration 400 have different data privacy requirements as each block chain is associated with a different user, wherein the other users may only have limited or partial access to one or more blocks on the block chains associated with the other users. In an alternative embodiment, the one or more block chains may have the same or similar data privacy requirements, wherein a system or user (pending authorization) may freely access and/or perform actions on all of the one or more block chains.

As illustrated in block 520 of FIG. 5, the system identifies an event associated with the one or more block chains. In one embodiment, the event may comprise the system (e.g., the block chain systems 10) adding a new block to the one or more block chains. In another embodiment, the event may comprise a request to add a new block to the one or more block chains. In yet another embodiment, the event may comprise an action (e.g., read, write, view, etc.) or request to perform an action on a block on the one or more block chains. In one embodiment, the system (e.g., the block chain systems 10) may be configured to monitor a data stream to identify one or more events associated with the one or more block chains. In one embodiment, an event may comprise an interaction associated with the one or more block chains such as a shared event recorded on all of the block chains associated with the shared event. In an exemplary embodiment, an event may comprise a transaction such as a resource transfer (e.g., funds, data, etc.) between first and second users, wherein the event is recorded on both a first block chain associated with the first user and a second block chain associated with the second user. In one embodiment, identification of an event by the system may be time-based, wherein the event is completion of a predetermined time limit.

As illustrated in block 530, based on the identified events, the system generates a link between the one or more block chains associated with the event. In one embodiment, the link generated by the system is a block associated with a shared event. In one embodiment, the link is a common event, block, series of blocks, chain segment, or the like shared between the one or more blocks chains associated with the event. The system creates links between events that are not necessarily on the same block chain. The system is configured to form a bridged connection (i.e., link) between discrete block chains based on the event. In this way, the discrete block chains may be linked together to provide a full accounting of an interaction or event history without fully exposing one block chain or the other completely thereby maintaining a level of privacy while providing customizable visibility between the chains. For example, a link may be generated based on a transaction between a first user and a second user, wherein the transaction may be recorded on both a first block chain associated with the first user and a second block chain associated with the second user.

In some embodiments, generating the link between block chains further comprises duplicating one or more blocks from at least one block chain to another. In one embodiment, the system generates a symbolic link or "symlink" between linked block chains or blocks comprising a reference or link from one block chain to another. In one embodiment, a symlink, link, reference, hash, or the like configured to link one or more block chains maybe stored on at least one of the linked block chains. In some embodiments, generating the link between the block chains may comprising duplicating or copying data from one block chain to another. In some embodiments, replicated data and/or meta data may be generated and stored on another block chain as part of generating a link.

In the exemplary embodiment of FIG. 4, the system generates a link between a first block chain associated with user A and a second block chain associated with user B based on an event associated with block AB1, wherein the event is a shared event between the first and second block chains. As illustrated in FIG. 4, the link is event-based and only formed based upon the shared event represented by block AB1 added to both the first and second block chains. In the exemplary embodiment of FIG. 4, the event represented by block AB1 forms a continued link between at least the first and second block chains continuing through block ABCn. In some embodiments, the continued link may be eventually broken by the system based on a new event that removes the link. For example, a shared linking event may comprise user A and user B cosigning a mortgage on a house, wherein the link may be broken upon the mortgage being completely paid and/or the house being sold.

In certain embodiments wherein a link is formed between block chains having different data privacy requirements, a level of visibility or data access between linked or bridged chains may be determined based on predetermined rules, authentication credentials, or the like. For example, a link may be generated between private block chains associated with different users, wherein each user may not wish the other user to have complete visibility of the data or information stored therein. In a specific example, the shared event providing basis for the generated link may comprise a transaction, wherein a user may not wish to expose the entirety of their transaction history to the other user. For at least these reasons, the system may be configured to generate links between block chains, wherein the generated links may provide customizable visibility. The system may be configured to provide a partial view across a generated link, wherein only a portion of the data or information associated with each block chain may be made visible to the other. In some embodiments, a partial view link or a partial link provides semi-private data access between block chains. For example, the partial link may be configured to restrict at least one of a read action and a write action between the first block chain and the second block chain. In one embodiment, the system may only make a minimum amount of the data or information visible that is required for validating or confirming the integrity of the data or information on each block chain. Alternatively, a generated link may provide a full view between one or more portions of linked block chains, wherein full visibility of the shared link is provided across one or more of the linked chains. In some embodiments, the system may generate more than one links between various blocks of one or more block chains, wherein the one or more links may have different levels of visibility (i.e., partial or full view) depending on the event associated with each individual link.

In the exemplary embodiment of FIG. 4, the system generates a number of links between a first block chain associated with user A and a second block chain associated with user B. The first link at block AB1, for example, may be a partial view link (i.e., dashed line), while another link at block ABC1 may be a full view link (i.e., solid line). In some embodiments, the system may determine visibility of a generated link based on the event associated with the link and/or predetermined privacy data requirements of each block and/or block chain.

In some embodiments, the system may be configured to generate links between multiple block chains associated with one or more users. For example, an event may comprise multiple block chains and/or associated users. As illustrated in the exemplary embodiment of FIG. 4, the system first generates a link between a first block chain associated with user A and a second block chain associated with user B at block AB1. This link continues through at least block AB2, wherein the system generates a new link to a third block chain associated with user C with addition of subsequent block ABC1 on the first, second, and third block chains. The system may be configured to generate customized links having tailored data visibility between multiple block chains, depending on the data privacy requirements of individual events, blocks, and/or block chains. As illustrated in FIG. 4, the system may generate customized partial view and/or full view links between the multiple block chains. In this way, the system may benefit from the advantageous aspects of both public and private block chains by providing a full accounting of event history to the linked users where applicable while simultaneously not unnecessarily exposing the entirety of each block chain.

In a specific exemplary embodiment, linked block chains, such as those linked block chains as illustrated in FIG. 4, may be related to a transaction associated with a sale of a house and change of ownership over time, wherein the house was originally purchased by user A before being sold to user B and then from user B to user C. By leveraging the bridged block chain technology described herein, the system may provide user C with a full accounting of the transactional history of the house without fully exposing the block chains of user A and user B which may contain sensitive or private information. In another specific example, user A is selling a house to user C, wherein user B is a bank having a lien on the house for which user C may not normally be aware without full accounting of the event history provided by the present invention.

In another specific embodiment, the system may be configured to generate and break links between block chains over time to correlate information. For example, groups or communities of users may be identified by the system based on smart analytics of their information (e.g., shared purchase history, type of homeowner, etc.). Access to these community blockchains may be determined by the system's analysis of the user information.

FIG. 6 provides an illustration of a hybrid edge distributed resource configuration 600, in accordance with aspects of the invention. The illustration depicts a configuration within a network framework (e.g., network 2) divided into one or more network zones. The illustrated network comprises a first zone 602 which in some embodiments may be a trusted or private zone maintained by one or more entities; a second zone 604 which may be a network perimeter zone or semi-private zone; and a third zone 606 which may be a public network (e.g., the Internet), cloud, or the like. The first and second zones and the second and third zones are divided by edges 608, 610 which separate the zones as defined boundaries. In some embodiments, each zone may have different data privacy requirements and/or visibility restrictions for accessing and/or performing actions on data stored therein by external and/or internal users. Each zone may be configured to store data therein such as on a block chain on a distributed network. The system may be configured to extend or project data stored in a zone across a corresponding edge into another zone. For example, as illustrated in FIG. 6, the first zone 602 comprises block chain 618, the second zone 604 comprises block chains 620 and 622, and the third zone 606 comprises block chain 624.

Each block chain comprises one or more blocks having varying data visibility based on data privacy requirements and access permissions or authorization. The system is configured to project blocks across an edge between zones, wherein a new block chain is generated. In some embodiments, only certain blocks on a block chain may be designated to be visible or accessible outside of a storage zone based on data privacy requirements of the zone. For example, block 626 is visible (i.e., white) from the first zone 602 to the second zone 604, whereas block 628 may be partially visible (i.e., striped). In some embodiments, partially visible blocks are not projected by the system. Instead, a partially visible block 628 may appear as restricted or blocked (e.g., shaded block 630) when projected across the edge. The system may generate a mapping token as a placeholder for a restricted block in order to validate the integrity of the projected, visible blocks and restricted non-visible portions. The mapping token provides the connection between the requested blocks if needed to validate the data without needing the non-visible or restricted blocks themselves. In some embodiments blocks not required for validating the data outside of the requested portions of the block chain are completely non-visible to an external user. For example, with respect to FIG. 6, an external user requesting block chain 620 may not be aware of the preceding, partially visible blocks 632 on block chain 618 in the first, trusted zone 602.

The first zone 602, the second zone 604, and the third zone 606 respectively comprise a first 612, second 614, and third 616 collector or system. In some embodiments, the collector 612, 614, 616 is configured to extract data projected from a zone and collect and transpose the projected data to a new zone. In some embodiments, the collectors may be positioned proximate an edge of the network and be configured to create a launchpad for transposing collected portions of a block chain from one zone to another (e.g., block collected from first zone 602 into second zone 604 in preparation for transposing data to third zone 606).

In some embodiments, a collector may not be directly related to a block chain (i.e., an external user or entity system). In addition to traditional read and write layers, the block chains described herein may be configured by the system with a third remote access layer, wherein the system is configured to open an access tunnel (e.g., private tunnel or public tunnel) for the external collector based on authorization of provided authentication credentials. In one embodiment opening an access tunnel (i.e., tunneling) refers to a protocol for transmitting data between devices wherein private network communications are allowed to be sent across a public network. Data may be broken into smaller data packets and encrypted. Private data packets may be encapsulated in public transmission data, wherein the private data packets appear as public data packets while traveling through a public network or semi-private network undetected. Non-limiting examples of tunneling protocols include Point-to-Point Tunneling Protocol (PPTP) and Layer Two Tunneling Protocol (L2TP).

It should be understood that the hybrid edge block chain configuration 600 illustrated in FIG. 4 should not be viewed as necessarily limiting. It should be understood that in other embodiments, it is conceived that the configuration 600 may comprise one or more network zones, block chains, edges, blocks, collectors, and the like. It should also be understood that one or more block chains may shift over time as one or more network edges shift.

FIG. 7 provides a high level process flow for secure distributed resource block mapping across a network edge, in accordance with aspects of the invention. The process flow of FIG. 7 may correspond to a hybrid edge block chain configuration such as, but not limited to, the hybrid edge block chain configuration of FIG. 6. As illustrated at block 710 of FIG. 7, the system may first receive a request to access and/or perform an action on a block chain within a zone of a network. In some embodiments, the request may be received from one or more of a user (e.g., user computer system 20), an entity system (e.g., entity systems 30, 40, 50), or the block chain systems 10. In some embodiments, a request may be received through a collector 612, 614, 616. Requesting parties may comprise external users outside of one or more of the network zones or internal users having permissioned access to at least one of the zones.

In some embodiments, the request may comprise one or more requested components from the block chain that the requesting party wishes to access. For example, with respect to FIG. 6, a request received from collector 614 may comprise authentication credentials and one or more requested components (i.e., one or more blocks or data) resources) from the first block chain 618.

In some embodiments, the request may further comprise authentication credentials associated with a requesting party (e.g., an external user). A requesting party may be required to authenticate the requesting party's identity before accessing a block chain. Likewise, one or more nodes, administrators or users of the block chains, or other entities interacting with or using the one or more block chains may be required to authenticate their identity for access to a particular feature or function of an application, device, and/or general or specific access to the one or more block chains, or the specific portions of the block chain therein, within the distributed block chain network. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

In some embodiments, a requesting system or user may be required to provide at least a portion of an authorization key pair (e.g., asymmetric key) as authentication credentials. In some embodiments, the authentication credentials may comprise at least a portion of an authorization key pair for authorizing access to the block chain, wherein a corresponding portion of the authorization key pair is stored on the block chain to which access has been requested. In some embodiments, the authorization key pair is externally injected to a block on the block chain, wherein access to the block is provided to the requesting party when the requesting party provides a portion of the corresponding pair. In an alternative embodiment, at least a portion of an authorization key pair may be added from a completed block as a resource to one or more subsequent blocks added to the block chain. The portion of the key pair may continue to be passed down from completed blocks to subsequent blocks. As completed blocks cannot be edited, this provides improved security to unauthorized access (i.e., hacking) which may attempt to change a key pair or externally inject an unauthorized key pair in an effort to circumvent conventional security measures. In this way, security of the block chain to unauthorized access attempts may be improved.

As illustrated in block 720, the system may authorize the request based on validating or confirming the authentication credentials of the requesting party. In some embodiments, the system may authorize the request by receiving and matching one or more portions of an authorization key pair from the requesting party.

As illustrated in block 730, the system collects the requested components of the block chain within a corresponding zone of the network based on the request. Then, as illustrated in block 740, the system projects the requested components across an edge from a first zone to a second zone to form a second block chain in the second zone. For example, with respect to FIG. 6, the system collects and projects visible components of the block chain 618 across the edge 608 from the first zone 602 to the second zone 604 to generate block chain 620 from the projected components. Stated another way, the system maps visible portions of the block chain 618 from a trusted or permissioned zone 602 to a public or semi-private zone 604 on generate block chain 620. In this way, only those blocks designated as being visible from the private chain 618 in the trusted zone 602 are provided whereas remaining blocks are kept private thereby minimizing unnecessary or unwanted data exposure while facilitating authorized public access. As illustrated in block 750, the system extracts data from or otherwise accesses the requested components on the generated block chain according to the authorized request. By only providing access at certain points to those visible blocks along a block chain while withholding non-visible blocks from the next zone, the system generates an access window for public or semi-private data access from a private zone to a public or semi-private zone across a network edge.

In one embodiment, the hybrid edge block chain configuration 600 may incorporate one or more features of the block chain configuration 400 of FIG. 4, wherein block chains may be linked as described in FIGS. 4 and 5 across the edges 608, 610 of FIG. 6.

In other examples of the invention, the one or more block chains may be utilized for events such as to formalize agreements. For example, the first block chain, or a first portion of a hybrid block chain may be private, and parts of the contract may include information to remain confidential, such as but not limited to the true name of the parties, the goods or services in the contract, the amount associated with the contract, account numbers for fund transfers, electronic signatures, or other terms and conditions of the contract. Alternatively, the second block chain, or a second portion of a hybrid block chain may be related to public portions of the contract, such as but not limited to, the verification that both parties agreed to the contract (e.g., identifiers for the electronic signatures, or the like), alias names of the signatories, alias names, party alias, account numbers aliases, or the like. In other embodiments, the contracts may be title documents, deeds, execution of wills, notary confirmations, or the like. In other examples, the execution of a contract and a checklist regarding the obligations of the contract may be stored on two separate private block chains (e.g., one for each party of the contract) in order to validate privately that both entities are complying with the contract.

In another example of the invention, the one or more block chains may be utilized for determining access to information in a credit report of a person. For example, the credit report of the user may be stored in various block chains, or access to different portions (e.g., multiple private or public block chains) may be restricted based on the user 4. For example, when applying for a rental application a landlord may be able to access a person's credit worthiness and the various places the person has lived from the credit report, but not other information, such as account information. However, when applying for a credit card, the credit card company may have access to the person's credit worthiness and account information. Finally, when applying for a home mortgage, the mortgage company may be certified and/or authenticated to access all of the credit report. In this way, access to a person's credit report may be more secure. Moreover, the information related to the private portions of the credit reports may be stored and controlled through one or more private block chains. As such, different levels of authentication may be utilized to access the different credit report information within a single private block chain, or in other aspects of the invention multiple private block chains (or portions thereof) may be used to store and/or access the different credit report information (e.g., $1^{st}$ information stored in first block chain, $2^{nd}$ information stored in second block chain, $N^{th}$ information stored in $N^{th}$ block chain associated with the event that required information from the credit report). It should also be understood that the public block chain (or portions thereof) may be used to make public information related to the event public in order to validate the occurrence of the event, while keeping the credit report information related to the event private.

In other examples of the invention, the one or more block chains may be utilized for events such as storing and disseminating reports, such as analyst reports. In one example, the first block chain, or a first portion of a hybrid block chain may be private, and parts of the reports may include information that should remain confidential, such as calculations, confidential financial information, break down of sales or expense information, or other like information that may be utilized to create an analyst report. Alternatively, the second block chain, or a second portion of a hybrid block chain may be related to public portions of reports, such as but not limited to, the public accounting information, public disclosures for expected future expenses, or the like.

In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems, devices, or components thereof described herein. For example, a portion of the block chain application 17 may be stored on the user computer systems 20 and/or entity systems 30, 40, 50, in order to achieve the inventions described herein.

It should be understood, that the systems, devices, and components described in FIGS. 1 and 2, or other devices not specifically described herein, may be configured to establish an electronic communications link with each other in order to accomplish the steps of the processes described herein. The link may be an internal link within the same entity (e.g., within the same financial institution for the nodes or components within the nodes) or an external link with the other systems of other entities (e.g., nodes or other systems controlled by other entities). The information within the block chains may be made continuously available, however, continuously available does not necessarily mean that the sources actually continuously generates data, but that a source is continuously available to generate and send data real-time (e.g., instantaneously and/or within a few seconds, or the like) of receiving a request for it. In any case, the sources may be continuously available to receive and/or generate information, in some cases in digitized data in Internet Protocol (IP) packet format.

Moreover, it should be understood that the process flows described herein include transforming the information sent and/or received from the applications of the different systems (e.g., internally or externally) from one or more data formats into a data format associated with the block chain application 17 for use by the one or more users 4. There are many ways in which information is converted within the block chain system environment 1. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 16/518,330 | SYSTEM FOR SELECTIVE MAPPING OF DISTRIBUTED RESOURCES ACROSS NETWORK EDGE FRAMEWORK FOR AUTHORIZED USER ACCESS | Filed Concurrently Herewith |

What is claimed is:

1. A system for generating event-based linkages between discrete distributed resources for tailored data visibility, the system comprising:
   a memory device with computer-readable program code stored thereon;
   a communication device connected to a network, the network having a first zone and a second zone separated by a network edge; and
   a processing device, wherein the processing device is configured to execute the computer-readable program code to:
     establish a first distributed resource and a second distributed resource, wherein the first distributed resource and the second distributed resource have different data privacy requirements, wherein the first distributed resource and the second distributed resource are discrete distributed resources, wherein the first distributed resource is associated with a first user, wherein the second distributed resource is associated with a second user, and wherein the first distributed resource is within the first zone of the network;
     identify an event associated with both the first distributed resource and the second distributed resource, wherein the event is added as a block on each of the first distributed resource and the second distributed resource;
     generate a link, via the block associated with the event, between the first distributed resource and the second distributed resource based on identifying the event, wherein the link is a shared segment between the first distributed resource and the second distributed resource;

receive a request from an external user to access the first distributed resource within the first zone of the network, wherein the request comprises authentication credentials associated with the external user and requested components of the first distributed resource;

authorize the request from the external user based on the authentication credentials;

collect the requested components of the first distributed resource in the first zone of the network based on the request;

project the requested components across the network edge from the first zone to the second zone thereby forming a third distributed resource, wherein only the requested components of the first distributed resource are visible to the external user on the third distributed resource in the second zone; and extract data from the requested components on the third distributed resource in the second zone.

2. The system of claim 1, wherein generating the link between the first distributed resource and the second distributed resource comprises generating a partial link between the first distributed resource and the second distributed resource, wherein the partial link provides semi-private data access between the first distributed resource and the second distributed resource.

3. The system of claim 2, wherein the partial link is configured to restrict at least one of a read action and a write action between the first distributed resource and the second distributed resource.

4. The system of claim 1, wherein generating the link between the first distributed resource and the second distributed resource further comprises duplicating one or more blocks from at least one of the first distributed resource and the second distributed resource to the other.

5. The system of claim 1, wherein generating the link between the first distributed resource and the second distributed resource further comprises generating a symlink between the first distributed resource and the second distributed resource, wherein the symlink is stored on at least one of the first distributed resource and the second distributed resource.

6. The system of claim 1, wherein the link generated between the first distributed resource and the second distributed resource is time-based, wherein the event is a predetermined time limit.

7. The system of claim 1, wherein the first distributed resource and the second distributed resource are private distributed resources, and wherein the link is a public or semi-private link between the private distributed resources.

8. The system of claim 1, wherein the event is associated with a resource transfer between the first user associated with the first distributed resource and the second user associated with the second distributed resource.

9. The system of claim 1, wherein the first distributed resource is a private distributed resource and the second distributed resource is a semi-private distributed resource or a public distributed resource.

10. A method for generating event-based linkages between discrete distributed resources for tailored data visibility, the method comprising:

establishing a first distributed resource and a second distributed resource, wherein the first distributed resource and the second distributed resource have different data privacy requirements, wherein the first distributed resource and the second distributed resource are discrete distributed resources, wherein the first distributed resource is associated with a first user, wherein the second distributed resource is associated with a second user, wherein the first distributed resource is within a first zone of a network, and wherein the network has the first zone and a second zone separated by a network edge;

identifying an event associated with both the first distributed resource and the second distributed resource, wherein the event is added as a block on each of the first distributed resource and the second distributed resource;

generating a link, via the block associated with the event, between the first distributed resource and the second distributed resource based on identifying the event, wherein the link is a shared segment between the first distributed resource and the second distributed resource;

receiving a request from an external user to access the first distributed resource within the first zone of the network, wherein the request comprises authentication credentials associated with the external user and requested components of the first distributed resource;

authorizing the request from the external user based on the authentication credentials;

collecting the requested components of the first distributed resource in the first zone of the network based on the request;

projecting the requested components across the network edge from the first zone to the second zone of the network thereby forming a third distributed resource, wherein only the requested components of the first distributed resource are visible to the external user on the third distributed resource in the second zone; and extracting data from the requested components on the third distributed resource in the second zone.

11. The method of claim 10, wherein generating the link between the first distributed resource and the second distributed resource comprises generating a partial link between the first distributed resource and the second distributed resource, wherein the partial link provides semi-private data access between the first distributed resource and the second distributed resource.

12. The method of claim 11, wherein the partial link is configured to restrict at least one of a read action and a write action between the first distributed resource and the second distributed resource.

13. The method of claim 10, wherein generating the link between the first distributed resource and the second distributed resource further comprises duplicating one or more blocks from at least one of the first distributed resource and the second distributed resource to the other.

14. The method of claim 10, wherein generating the link between the first distributed resource and the second distributed resource further comprises generating a symlink between the first distributed resource and the second distributed resource, wherein the symlink is stored on at least one of the first distributed resource and the second distributed resource.

15. The method of claim 10, wherein the link generated between the first distributed resource and the second distributed resource is time-based, wherein the event is a predetermined time limit.

16. The method of claim 10, wherein the first distributed resource and the second distributed resource are private distributed resources, and wherein the link is a public or semi-private link between the private distributed resources.

17. The method of claim 10, wherein the event is associated with a resource transfer between the first user associated with the first distributed resource and the second user associated with the second distributed resource.

18. The method of claim 10, wherein the first distributed resource is a private distributed resource and the second distributed resource is a semi-private distributed resource or a public distributed resource.

19. A computer program product for generating event-based linkages between discrete distributed resources for tailored data visibility, wherein the computer program product comprises a non-transitory computer-readable medium comprising computer-readable instructions, the computer-readable instructions, when executed by a processing device, causes the processing device to:
- establish a first distributed resource and a second distributed resource, wherein the first distributed resource and the second distributed resource have different data privacy requirements, wherein the first distributed resource and the second distributed resource are discrete distributed resources, wherein the first distributed resource is associated with a first user, wherein the second distributed resource is associated with a second user, wherein the first distributed resource is within a first zone of a network, and wherein the network has the first zone and a second zone separated by a network edge;
- identify an event associated with both the first distributed resource and the second distributed resource, wherein the event is added as a block on each of the first distributed resource and the second distributed resource;
- generate a link, via the block associated with the event, between the first distributed resource and the second distributed resource based on identifying the event, wherein the link is a shared segment between the first distributed resource and the second distributed resource;
- receive a request from an external user to access the first distributed resource within the first zone of the network, wherein the request comprises authentication credentials associated with the external user and requested components of the first distributed resource;
- authorize the request from the external user based on the authentication credentials;
- collect the requested components of the first distributed resource in the first zone of the network based on the request;
- project the requested components across the network edge from the first zone to the second zone of the network thereby forming a third distributed resource, wherein only the requested components of the first distributed resource are visible to the external user on the third distributed resource in the second zone; and
- extract data from the requested components on the third distributed resource in the second zone.

20. The computer program product of claim 19, wherein generating the link between the first distributed resource and the second distributed resource comprises generating a partial link between the first distributed resource and the second distributed resource, wherein the partial link provides semi-private data access between the first distributed resource and the second distributed resource.

* * * * *